United States Patent
Lee et al.

(10) Patent No.: US 10,382,989 B2
(45) Date of Patent: Aug. 13, 2019

(54) D2D OPERATION METHOD PERFORMED BY UE IN WIRELESS COMMUNICATION SYSTEM AND UE USING SAME METHOD

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/578,559

(22) PCT Filed: Jun. 1, 2016

(86) PCT No.: PCT/KR2016/005818
§ 371 (c)(1),
(2) Date: Nov. 30, 2017

(87) PCT Pub. No.: WO2016/195383
PCT Pub. Date: Dec. 8, 2016

(65) Prior Publication Data
US 2018/0176805 A1    Jun. 21, 2018

Related U.S. Application Data

(60) Provisional application No. 62/169,546, filed on Jun. 1, 2015.

(51) Int. Cl.
*H04W 24/08* (2009.01)
*H04W 76/10* (2018.01)
(Continued)

(52) U.S. Cl.
CPC .......... *H04W 24/08* (2013.01); *H04W 76/10* (2018.02); *H04W 92/10* (2013.01); *H04W 92/18* (2013.01);
(Continued)

(58) Field of Classification Search
CPC ..... H04W 8/005; H04W 24/02; H04W 24/08; H04W 36/0085; H04W 36/30;
(Continued)

(56) References Cited

U.S. PATENT DOCUMENTS 8,504,052 B2 *  8/2013  Hakola ................. H04W 24/10
                                                              455/452.1
8,903,327 B2 * 12/2014  Garavaglia .......... H04L 1/0026
                                                              455/69
(Continued)

FOREIGN PATENT DOCUMENTS

WO    WO 2014/069064 A1    5/2014
WO    WO 2015/004142 A1    1/2015

OTHER PUBLICATIONS

3GPP TS 36.304 V8.5.0 (Mar. 2009), "3rd Generation Partnership Project; Technical Specification Group Radio Access Network; Evolved Universal Terrestrial Radio Access (E-UTRA); User Equipment (UE) procedures in idle mode (Release 8)", Technical Specification, published on Mar. 2009.
(Continued)

*Primary Examiner* — Tri H Phan
(74) *Attorney, Agent, or Firm* — Birch, Stewart, Kolasch & Birch, LLP

(57) ABSTRACT

The present invention provides a device-to-device (D2D) operation method performed by a remote UE in a wireless communication system, the method comprising: measuring the quality of a link between a relay UE and the remote UE on the basis of an offset; and selecting a relay UE suitable
(Continued)

for the remote UE on the basis of the measurement, wherein the offset is determined on the basis of information which may have an effect on communicating with a base station by the remote UE through the relay UE.

11 Claims, 15 Drawing Sheets

(51) Int. Cl.
*H04W 92/10* (2009.01)
*H04W 92/18* (2009.01)
*H04W 88/04* (2009.01)
*H04W 88/08* (2009.01)
*H04W 92/20* (2009.01)

(52) U.S. Cl.
CPC ............ *H04W 88/04* (2013.01); *H04W 88/08* (2013.01); *H04W 92/20* (2013.01)

(58) Field of Classification Search
CPC ..... H04W 48/20; H04W 76/02; H04W 76/10; H04W 88/04; H04W 88/08; H04W 92/10; H04W 92/18; H04W 92/20
See application file for complete search history.

(56) References Cited

U.S. PATENT DOCUMENTS

| | | | |
|---|---|---|---|
| 9,265,078 B2 * | 2/2016 | Lim | H04W 8/005 |
| 9,699,749 B2 * | 7/2017 | Chae | H04W 8/005 |
| 9,775,066 B2 * | 9/2017 | Lee | H04L 5/0092 |
| 10,075,863 B2 * | 9/2018 | Delsol | H04W 36/0094 |
| 2011/0081903 A1 * | 4/2011 | Cai | H04W 36/0058 455/424 |
| 2011/0275382 A1 * | 11/2011 | Hakola | H04W 24/10 455/452.2 |
| 2013/0072123 A1 | 3/2013 | Garavaglia et al. | |
| 2016/0205717 A1 * | 7/2016 | Kazmi | H04W 8/005 455/435.2 |
| 2018/0139794 A1 * | 5/2018 | Chae | H04W 40/12 |

OTHER PUBLICATIONS

3GPP TS 36.331 V12.5.0 (Mar. 2015), "3rd Generation Partnership Project; Technical Specification Group Radio Access Network; Evolved Universal Terrestrial Radio Access (E-UTRA); Radio Resource Control (RRC); Protocol specification (Release 12)", Technical Specification, published on Mar. 2015.

* cited by examiner

D2D OPERATION METHOD PERFORMED BY UE IN WIRELESS COMMUNICATION SYSTEM AND UE USING SAME METHOD

CROSS REFERENCE TO RELATED APPLICATIONS

This application is the National Phase of PCT International Application No. PCT/KR2016/005818, filed on Jun. 01, 2016, which claims priority under 35 U.S.C. 119(e) to U.S. Provisional Application No. 62/169,546, filed on Jun. 01, 2015, all of which are hereby expressly incorporated by reference into the present application.

BACKGROUND OF THE INVENTION

Field of the Invention

The present invention relates to wireless communication and, most particularly, to a D2D operation method performed by a UE in a wireless communication system and a UE using the same method.

Related Art

The International Telecommunication Union Radio communication sector (ITU-R) is carrying out a standardization process of International Mobile Telecommunication (IMT)-Advanced, which is a next generation mobile communication system developed after the $3^{rd}$ generation mobile communication system. The IMT-Advanced seeks to achieve the goal of providing Internet Protocol (IP)-based multimedia service support at a data transmission rate of 1 Gbps in an immobile state and a low-speed mobile state, and 100 Mbps in a high-speed mobile state.

As a system standard satisfying the requirements of the IMT-Advanced, the 3rd Generation Partnership Project (3GPP) is preparing for LTE-Advanced (LTE-A), which corresponds to an enhanced version of the Long Term Evolution (LTE) that is based on the Orthogonal Frequency Division Multiple Access (OFDMA)/Single Carrier-Frequency Division Multiple Access (SC-FDMA) transmission schemes. The LTE-A is one of the most promising candidates for the IMT-Advanced.

Interest has recently been growing in the Device-to-Device (D2D) technology, wherein direct communication is carried out between devices. Most particularly, D2D is drawing attention as the communication technology being suitable for public safety network. Although the commercial communication network is quickly shifting to LTE, due to the problem of collision with the legacy communication standard and the issue of cost, the current public safety network is still mostly based on the 2G technology. Such gap between the communication technologies and demand for more enhanced services are now leading to efforts in seeking to enhance the public safety network.

In comparison with the commercial communication network, the public safety network has a higher service requirement condition (reliability and security), and, most particularly, even when the coverage of cellular communication does not reach or is unavailable, the public safety network still requires direct transmission and reception of signals between devices, i.e., D2D operation.

D2D operation may have diverse advantages in that it can perform signal transmission and reception between close-ranged devices. For example, a D2D user equipment (UE) may perform data communication at a high transmission rate and low latency. Moreover, the D2D operation may scatter (or distribute or disperse) traffic that is being concentrated to a base station. If the D2D UE performs the role of a relay station, this may also result in expanding the coverage of the base station.

In the related art, it was impossible for a D2D UE located within the coverage of a base station to relay data transmitted from the base station to another D2D UE, which is located outside of the coverage of the base station. Accordingly, in order to resolve the above-described problem, a method for relaying data transmitting from a base station, by a D2D UE located within the coverage of a base station, to a D2D UE located outside of the coverage of the base station will be provided. At this point, a UE within the coverage of the base station (i.e., in coverage) relaying data to a UE located outside of the coverage of the base station (i.e., out of coverage) is referred to as a D2D relay user equipment (UE) and may also be referred to as a 'relay UE'. Also, a UE receiving data from a relay UE while being located outside of the coverage of the base station may be referred to as a D2D remote user equipment (UE) and may also be referred to as a 'remote UE'.

Herein, in case the remote UE fails to select an adequate relay UE, it may be impossible for the remote UE to perform communication with the network. Accordingly, it is important for the remote UE to select an adequate relay UE and to perform communication with the base station through the selected relay UE.

Accordingly, a detailed description on a method of a remote UE for selecting a relay UE and a device using the same will hereinafter be provided.

SUMMARY OF THE INVENTION

A technical object that is to be achieved by the present invention is to provide a D2D operation method performed by a UE in a wireless communication system and a UE using the same method.

In an aspect, a device-to-device (D2D) operation method performed by a remote user equipment (UE) in a wireless communication system is provided. The method may comprise measuring a link quality between a relay UE and the remote UE based on an offset, and selecting a relay UE suitable for the remote UE based on the measurement. The offset may be determined based on information capable of causing influence when the remote UE performs communication with a base station through the relay UE.

The information may include information capable of causing influence on a link quality between the relay UE and the base station.

The information capable of causing influence on a link quality between the relay UE and the base station may correspond to information related to a transmission power of the base station.

The information capable of causing influence on a link quality between the relay UE and the base station may correspond to information related to a traffic load.

The information capable of causing influence on a link quality between the relay UE and the base station may correspond to information related to a transmission antenna configuration of the base station.

A link between the relay UE and the base station may correspond to a Uu link.

The information may include information capable of causing influence on a link performance between the relay UE and the remote UE.

The information capable of causing influence on a link performance between the relay UE and the remote UE may correspond to information related to a transmission capability of the relay UE.

The information capable of causing influence on a link performance between the relay UE and the remote UE may correspond to information on an antenna configuration of the relay UE.

The offset may be configured in accordance with service types that the remote UE wishes to be provided from the base station.

The information may be received from the relay UE through a pre-defined D2D channel.

A link between the relay UE and the remote UE may correspond to a PC5 link.

In another aspect, a remote user equipment (UE) is provided. The remote UE may comprise a radio frequency (RF) unit transmitting and receiving radio signals; and a processor being operatively connected to the RF unit. The processor may be configured to measure a link quality between a relay UE and the remote UE based on an offset, and select a relay UE suitable for the remote UE based on the measurement. The offset may be determined based on information capable of causing influence when the remote UE performs communication with a base station through the relay UE.

According to the present invention, a D2D operation method performed by a UE in a wireless communication system and a UE using the same method are provided.

According to the present invention, in order to select an adequate relay UE, the UE (e.g., remote UE) may consider an offset. In performing communication between the UE and the base station through the relay UE, the offset in this case may be determined based on information (or factors) that may cause influence on the communication. Accordingly, the remote UE may select an adequate relay UE by considering the offset, and the remote UE that has selected the adequate relay UE may perform smooth communication with the base station through the relay UE. Accordingly, the remote UE may perform continuous communication, and the overall efficiency of the wireless communication system may be enhanced.

DESCRIPTION OF EXEMPLARY EMBODIMENTS

Figure 1:
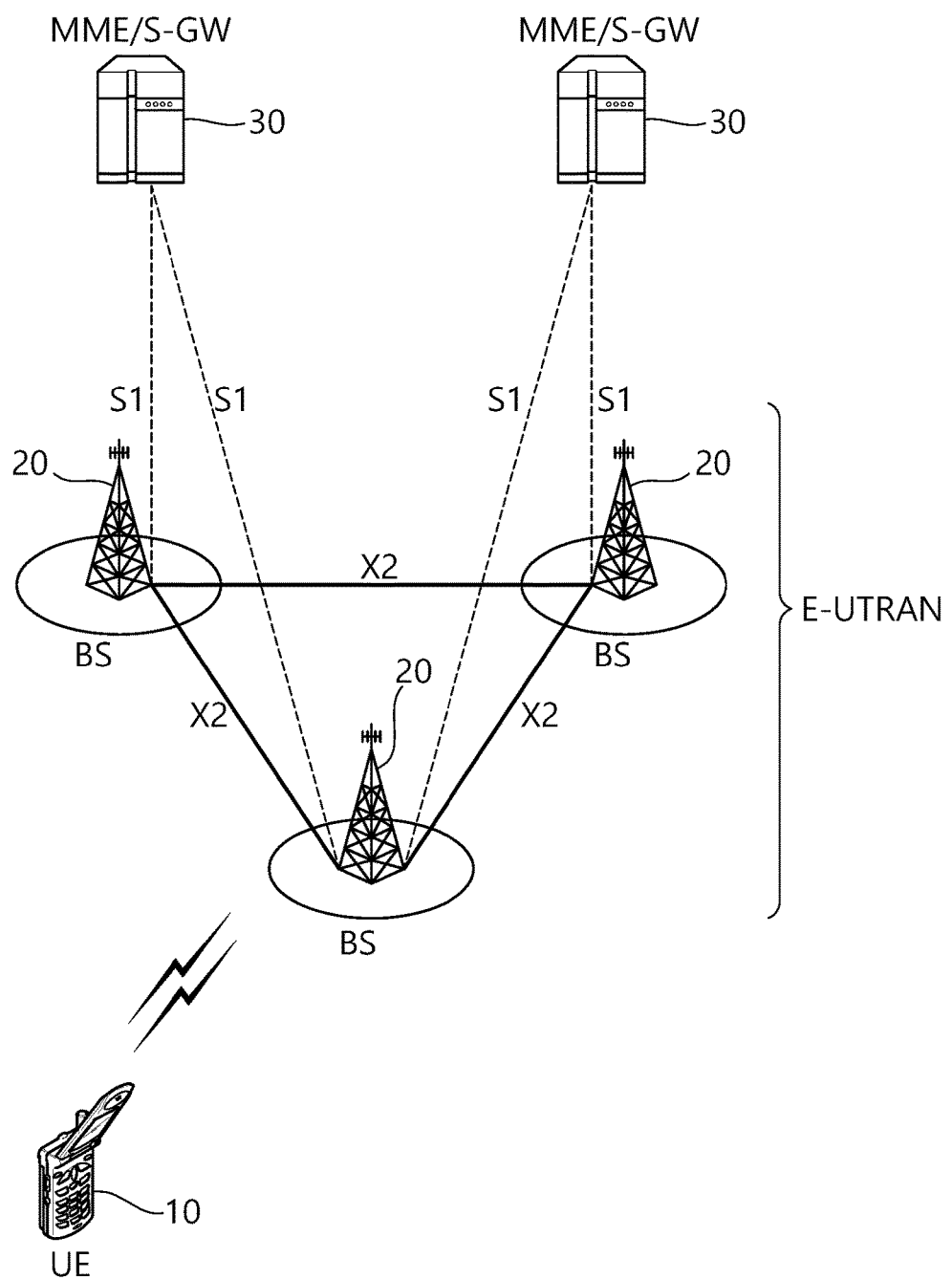
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
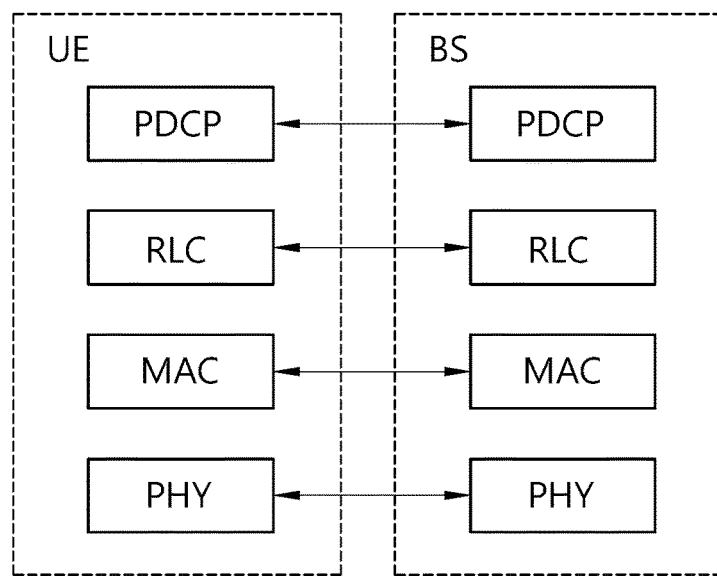
FIG. 2 is a diagram showing a wireless protocol architecture for a user plane.
Figure 3:
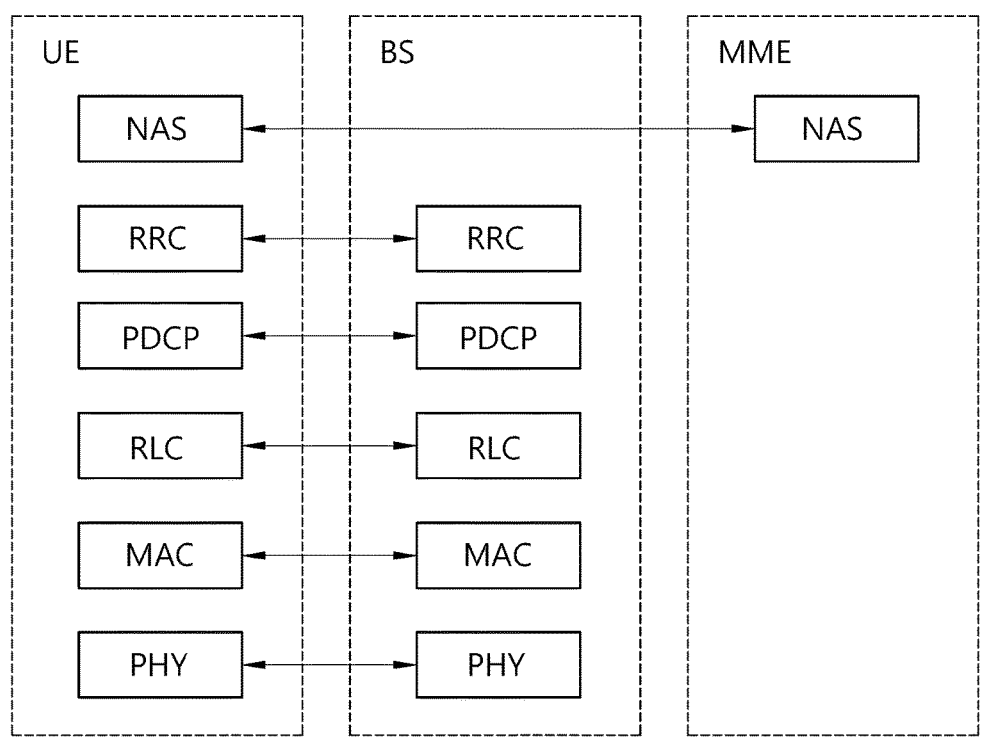
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBS).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
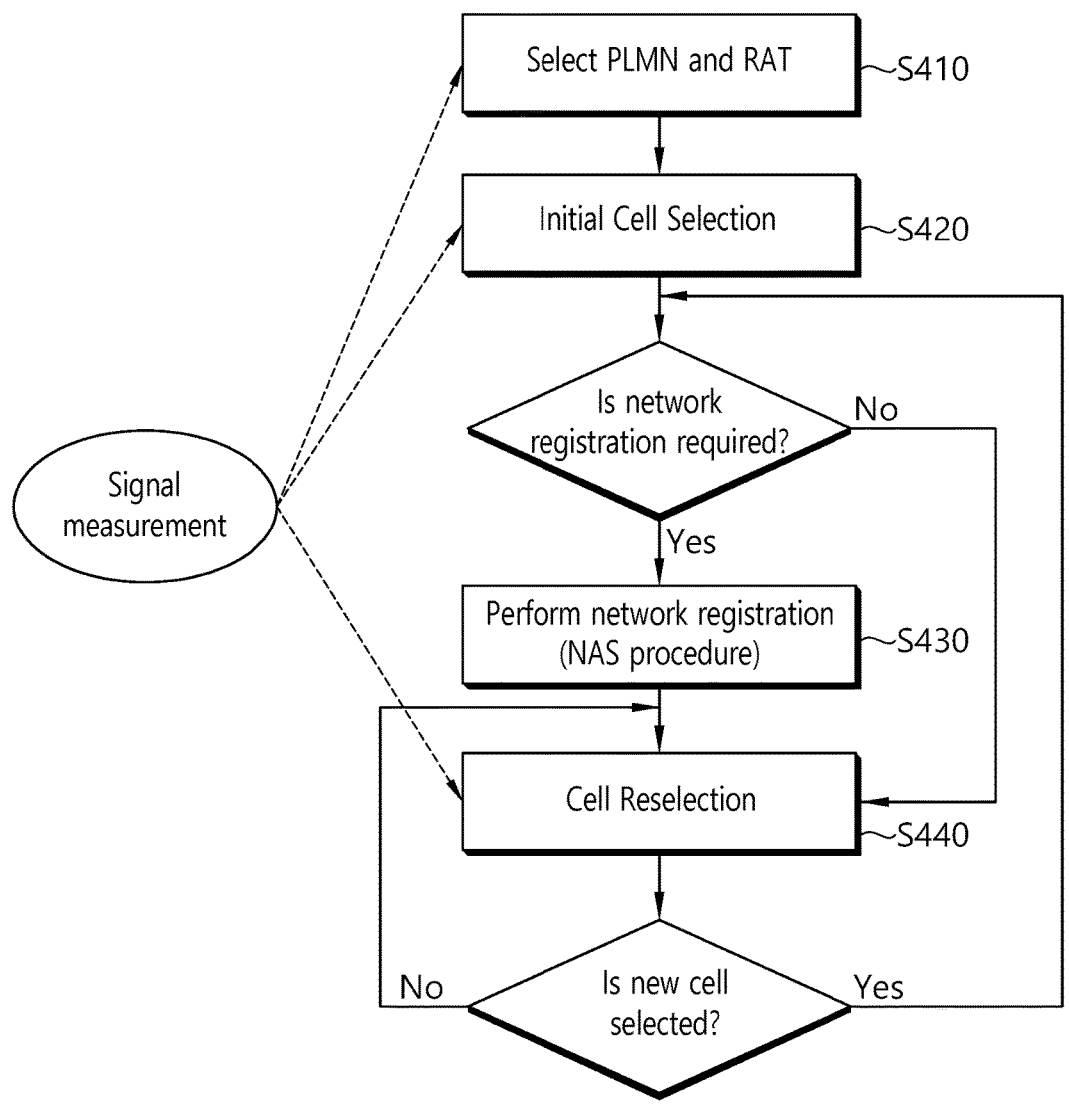
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
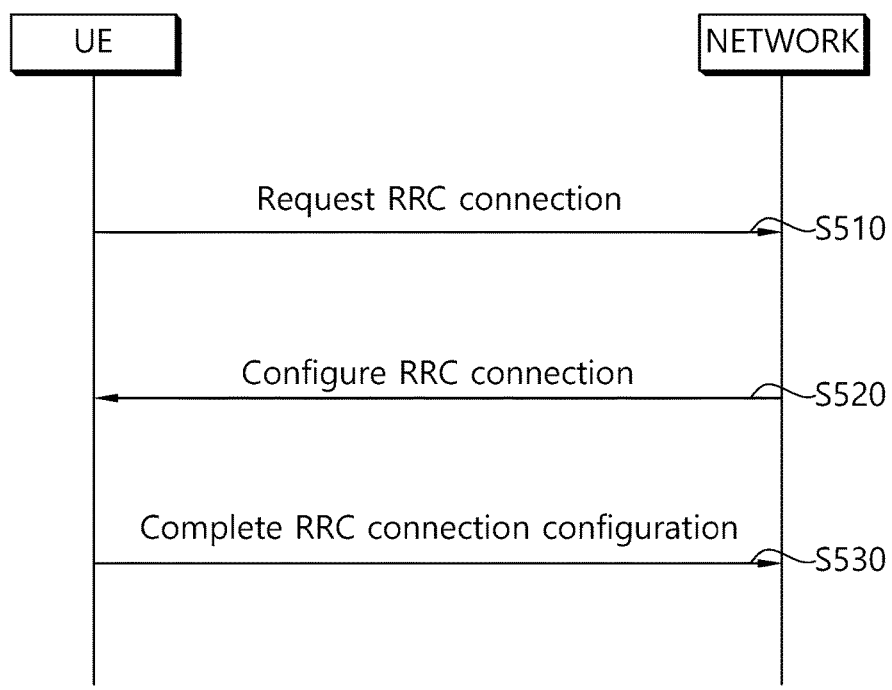
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
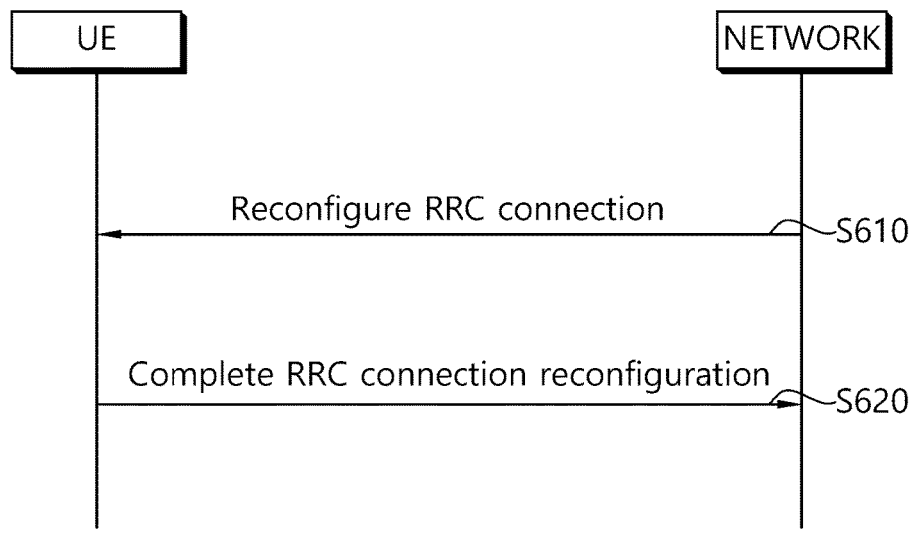
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev>0 \text{ AND } Squal>0, \quad \text{[Equation 1]}$$

where:

$$Srxlev = Q_{rxlevmeas} - (Q_{rxlevmin} + Q_{rxlevminoffset}) - P_{compensation},$$

$$Squal = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.
First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
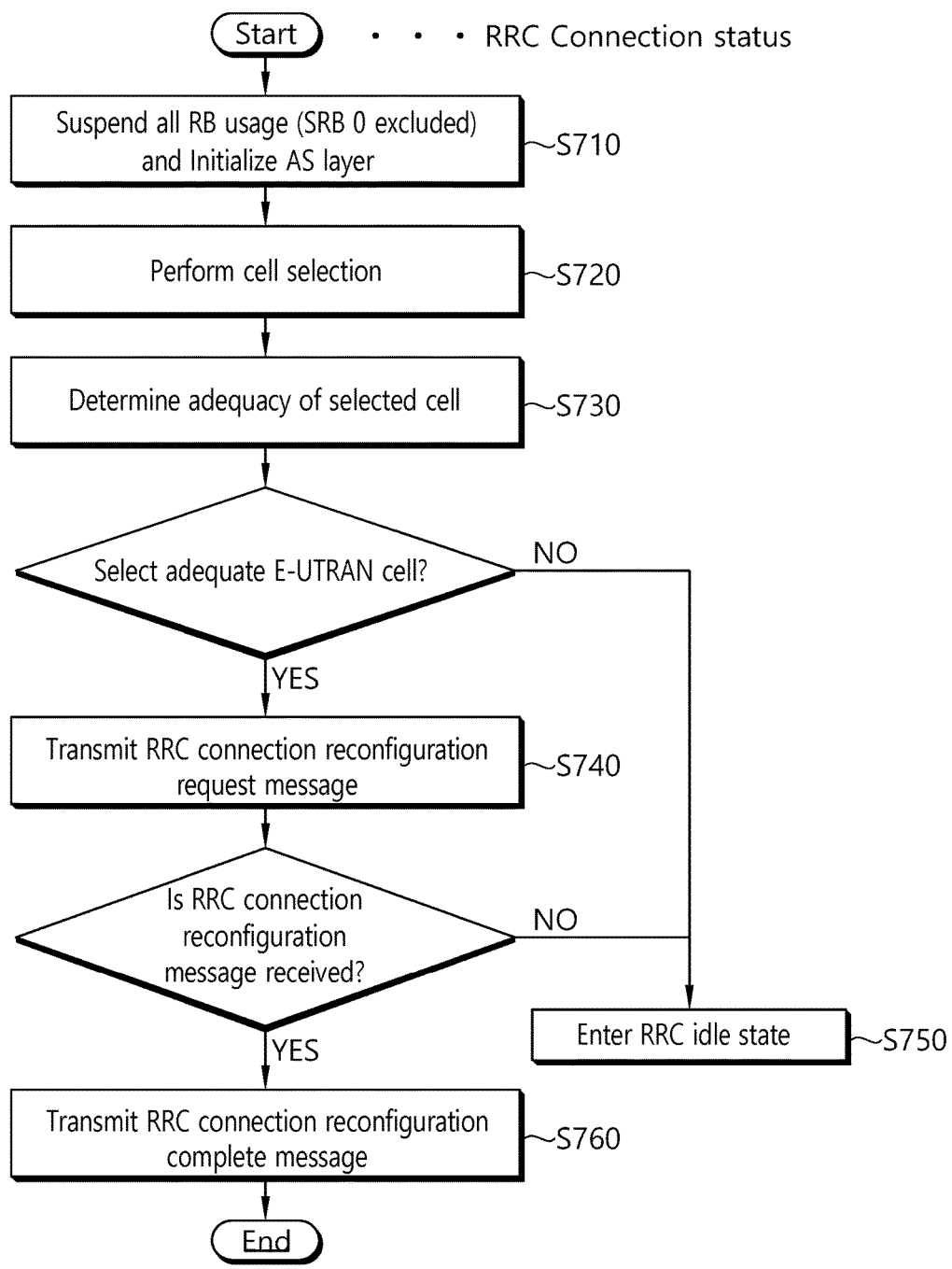
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer.

The UE may obtain the set value of the timer from the system information of the serving cell.

If an RRC connection re-establishment request message is received from the UE and the request, is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
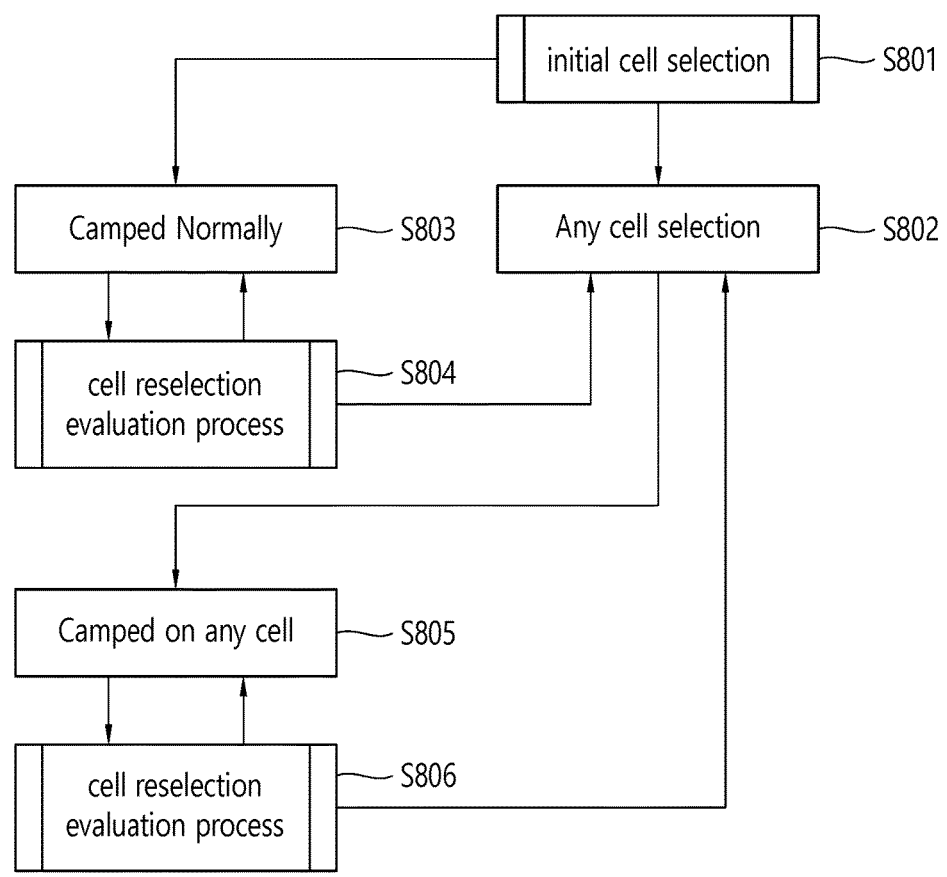
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
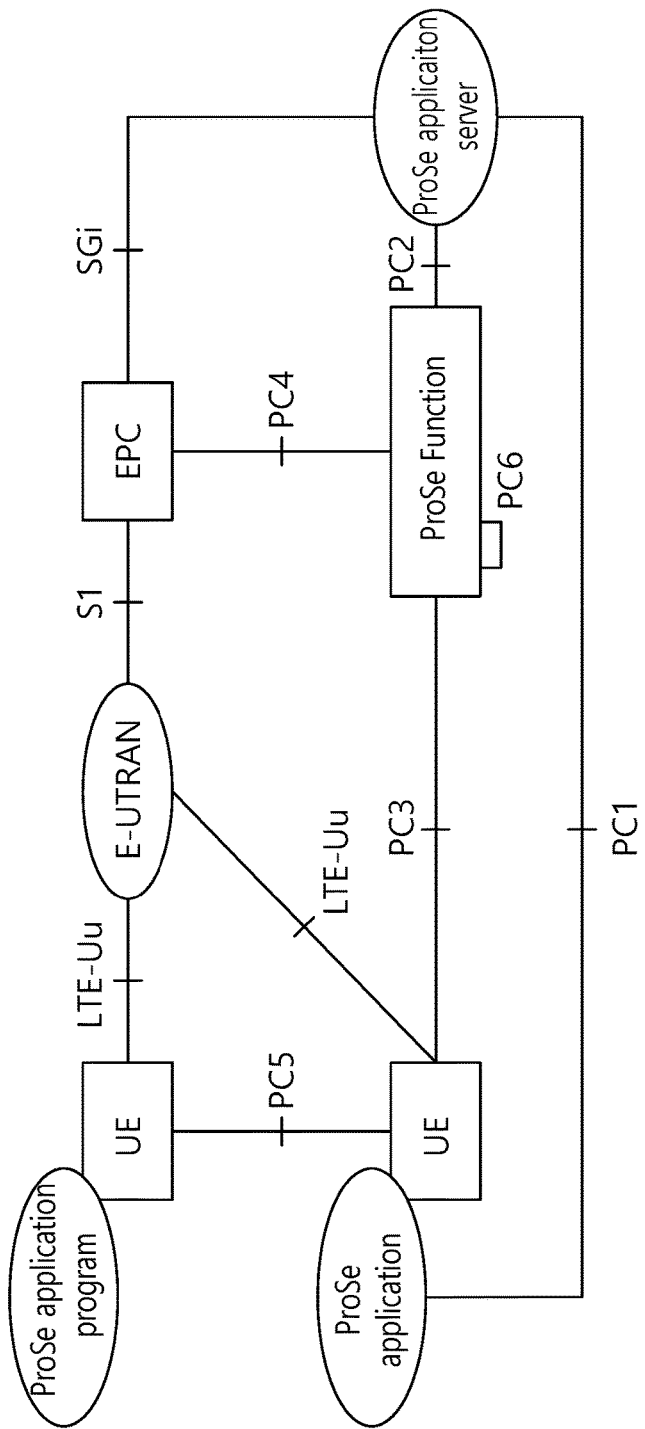
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications
Authorization and configuration of the UE for discovery and direct communication)
Enable the function of the EPC level ProSe discovery
ProSe related new subscriber data and handling of data storage, and also handling of ProSe identities
Security related function
Provide control towards the EPC for policy related function
Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
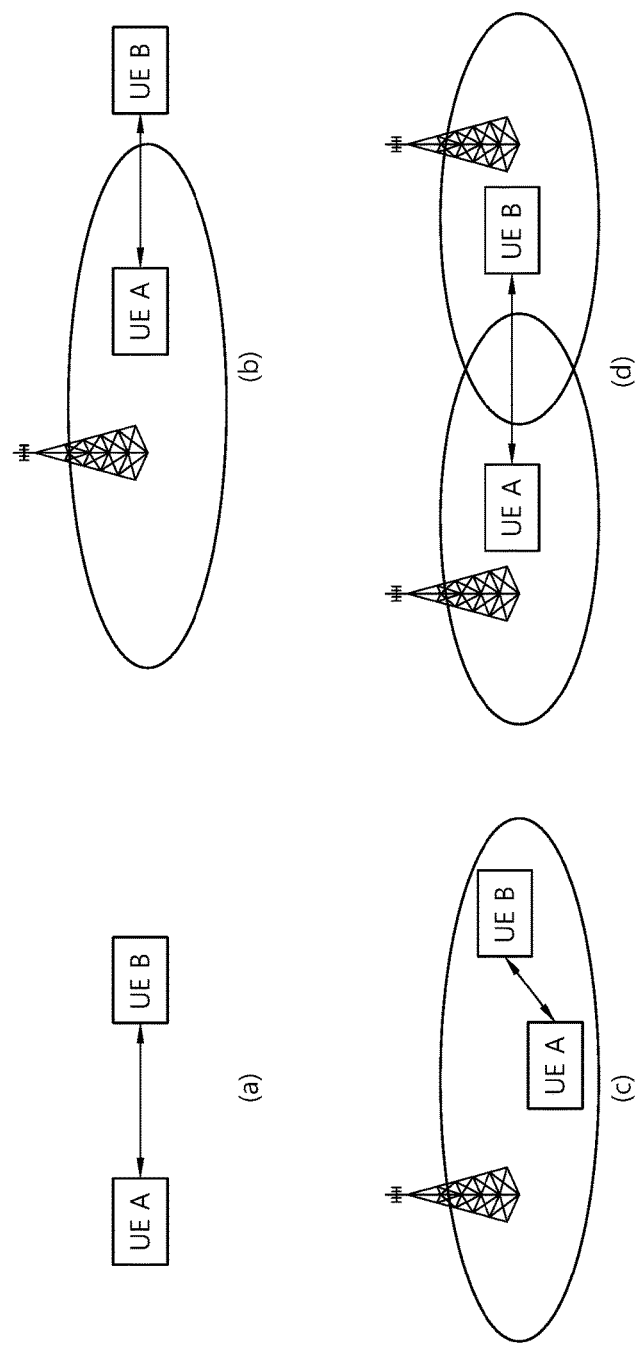
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(*a*), UEs A and B may be located outside of the cell coverage. Referring to FIG. 10(*b*), the UE A may be located in the cell coverage and the UE B may be located outside of the cell coverage. Referring to FIG. 10(*c*), both of UEs A and B may be located in the cell coverage. Referring to FIG. 10(*d*), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
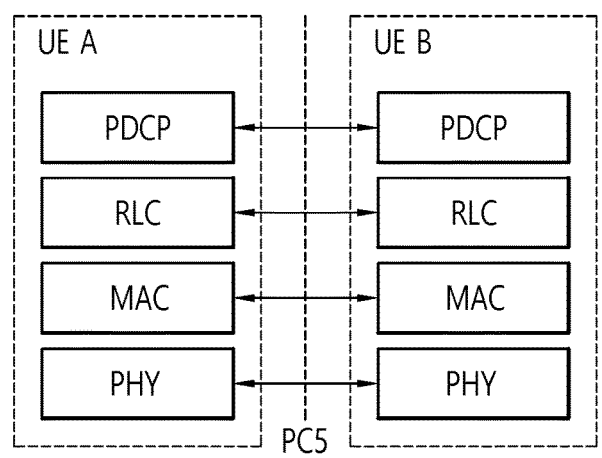
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
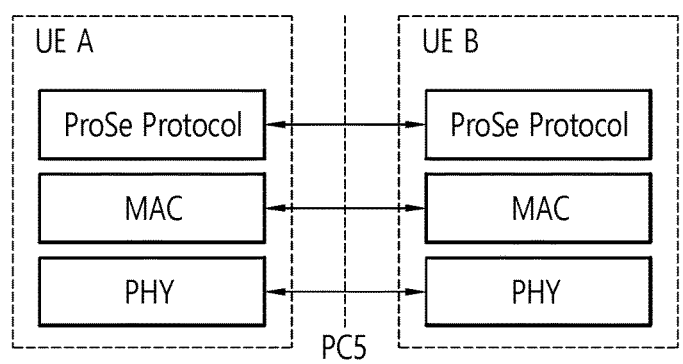
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, the present invention will be described in detail.

In the related art, it was impossible for a (D2D) UE located within the coverage of a base station to relay data transmitted from the base station to another (D2D) UE, which is located outside of the coverage of the base station. Accordingly, in order to resolve the above-described problem, a method for relaying data transmitting from a base station, by a (D2D) UE located within the coverage of a base station, to a (D2D) UE located outside of the coverage of the base station will be provided. At this point, a UE within the coverage of the base station (i.e., in coverage) relaying data to a UE located outside of the coverage of the base station (i.e., out of coverage) is referred to as a D2D relay user equipment (UE) and may also be referred to as a 'relay UE'. Also, a UE receiving data from a relay UE while being located outside of the coverage of the base station may be referred to as a D2D remote user equipment (UE) and may also be referred to as a 'remote UE'.

Herein, in case the remote UE fails to select an adequate relay UE, it may be impossible for the remote UE to perform communication with the network (or to stably receive data being transmitted from the network through the relay UE). Accordingly, it is important for the remote UE to select an adequate relay UE and to perform communication with the base station through the selected relay UE (or to stably receive data being transmitted from the network through the relay UE).

In selecting the adequate relay UE, the remote UE may consider the quality of the link between the remote UE and the relay UE. Generally, it may be preferable that the remote UE selects a relay UE that establishes an excellent link quality with the remote UE. However, for example, even if the link quality between the remote UE and the relay UE is excellent, if the link quality between the relay UE and the base station is bad, simply selecting a relay UE that establishes an excellent link quality with the remote UE may not qualify as a preferable choice. Moreover, for example, it may be more effective to select the (optimal) relay UE by additionally considering the (actual) communication quality between the relay UE and the base station and/or diverse factors (e.g., (transmitting/receiving) antenna configuration, and so on) causing influence on the (actual) communication quality between the relay UE and the base station.

Accordingly, in order to resolve the above-described problems, when the remote UE selects a relay UE, the present invention provides a method and device for selecting a relay UE by considering an offset (e.g., an offset considering information based on the link quality between the relay UE and the base station, an offset (additionally) considering the (actual) communication quality between the relay UE and the base station and/or diverse factors (e.g., (transmitting/receiving) antenna configuration, and so on) causing influence on the (actual) communication quality between the relay UE and the base station, and so on).

More specifically, when a D2D communication based relay communication is established and performed between a REMOTE UE (i.e., hereinafter referred to as "RM_UE") and a RELAY UE (i.e., hereinafter referred to as "RL_UE"), the present invention proposes a method allowing the RM_UE to efficiently perform a LINK QUALITY (i.e., PC5 LINK QUALITY) between the RL_UE and the RM_UE for RL_UE (RE)SELECTION.

Herein, for example, D2D communication refers to a communication method that is performed by a UE with another UE by using a direct radio channel. Herein, for example, even though the UE refers to a device (or equipment) of the user, in case a network device, such as the base station, transmits/receives a signal in accordance with a communication scheme between the network device and a UE, the network device may also be considered as a type of UE. Furthermore, for example, the CHANNEL/SIGNAL types and the respective abbreviations that are used in the D2D communication are as presented below.

PSBCH (Physical Sidelink Broadcast CHannel)
PSCCH (Physical Sidelink Control CHannel)
PSDCH (Physical Sidelink Discovery CHannel)
PSSCH (Physical Sidelink Shared CHannel)
SLSS (Sidelink Synchronization Signal)
(A) PSSS (Primary Sidelink Synchronization Signal)
(B) SSSS (Secondary Sidelink Synchronization Signal)

In selecting the relay UE, the remote UE may perform discovery, i.e., measurement of a PC5 link quality between the relay UE and the remote UE by using a DMRS of a PSDCH transmission.

However, discovery and communication may have different RB sizes, different equations corresponding to power, and different transmission patterns. Additionally, the situation where interference occurs may also differ between the discovery and the communication. Accordingly, it may not be preferable to select a relay based on the measurement result of the discovery.

Accordingly, in selecting the relay UE, the remote UE may consider a RSRQ (herein, the RSRQ may be determined based on a RSSI, which reflects interference information corresponding to the actual communication) corresponding to the link through which the actual communication is established.

Most particularly, an example of the RM_UE performing the measurement of a LINK QUALITY (i.e., PC5 LINK QUALITY) between the RL_UE and the RM_UE for performing RL_UE (RE)SELECTION is as described below.

In case a PSDCH is used for performing relay discovery:
the UE (i.e., remote UE (or relay UE)) may perform measurement of a PC5 link quality between the relay UE and the remote UE by using a DMRS of a PSDCH transmission within a resource that has established a CRC pass.

(A) An RSRP measurement for at least a PC5 link quality (measurement) may be specified, and RSRP filtering(/measurement) may be performed within resources in which the same ID is decoded.

(B) An RSRQ or other link quality measurement may be specified for performing the PC5 link quality (measurement).

(C) A restriction may be specified to a power offset between a PSDCH and a PSSCH that are related to a given relay.

The following proposed methods propose a method allowing the RM_UE for efficiently performing PC5 LINK QUALITY measurement for RL_UE (RE)SELECTION.

Herein, for example, for simplicity in the description, (as described above), assumed herein is a situation where a RM_UE#X measures a PC5 LINK QUALITY based on a DM-RS (i.e., a DM-RS within a PSDCH wherein the ID of a RL_UE#Y is detected, while CRC PASS is established) within a PSDCH that is being transmitted from a RL_UE#Y.

However, for example, the proposed methods of the present invention may also be extendedly applied to a case of having the RM_UE#X measure the PC5 LINK QUALITY based on another channel/signal (e.g., PSSCH, PSCCH, PSBCH, PSSS/SSSS) that is transmitted from the RL_UE#Y.

Additionally, for example, the proposed methods of the present invention may also be extendedly applied to a case of having the RL_UE measure the PC5 LINK QUALITY for the RM_UE (RE)SELECTION.

Figure 13:
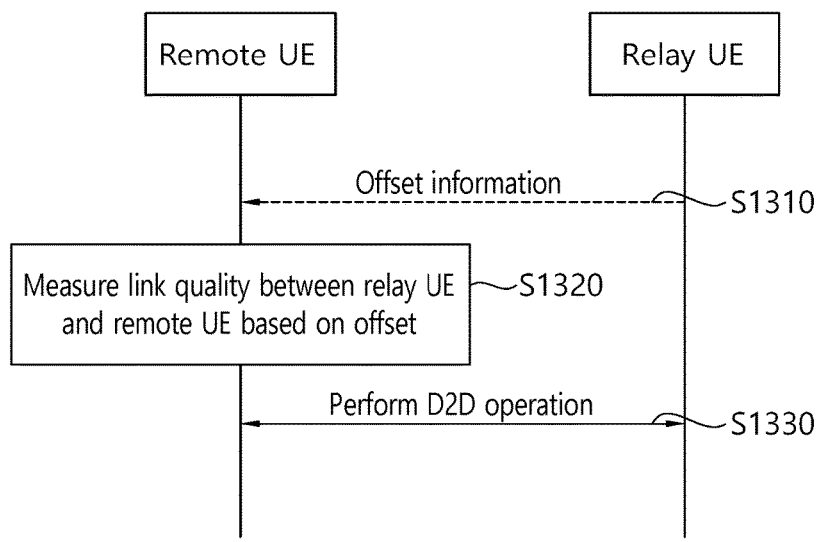
FIG. 13 is a flow chart showing a relay UE selection method of a remote UE according to an exemplary embodiment of the present invention.

FIG. 13 is a flow chart showing a relay UE selection method of a remote UE according to an exemplary embodiment of the present invention.

Referring to FIG. 13, a UE (e.g., remote UE) may receive information on an offset from a relay UE (S1310). At this point, the step of receiving, by a remote UE, information on an offset from a relay UE does not correspond to an essential configuration. And, therefore, details on receiving information related to the offset from the relay UE and a detailed example on the information related to the offset will be described later on in detail.

The UE (e.g., remote UE) may measure the link quality between the relay UE and the remote UE based on the offset (S1320). At this point, the link between the relay UE and the remote UE may correspond to the above-described described PC5 link. At this point, the offset may include information on the quality of a link (i.e., Uu link) between the relay UE and the remote UE, and details on the above-described offset will hereinafter be described in detail.

More specifically,

[Proposed Method #1] A rule allowing the RM_UE#X to perform PC5 LINK QUALITY measurement by applying an offset value that is defined in advance (or signaled through a pre-defined channel (e.g., SIB (FOR RRC_IDLE UE, OUT-OF-COVERAGE UE), (DEDICATED) RRC SIGNALING (FOR RRC_CONNECTED UE)), when performing a PC5 LINK QUALITY measurement related to the PC5 LINK QUALITY, may be defined.

Herein, for example, the corresponding PC5 LINK QUALITY measurement may correspond to a RSRP measurement (which is performed based on a DM-RS within a PSDCH herein the ID of the RL_UE#Y within a CRC PASS) (as described above).

Also, for example, the corresponding offset value may be interpreted as a BIAS VALUE corresponding to an ABSOLUTE QUALITY of the PC5 LINK QUALITY, which is performed by the RM_UE#X.

Additionally, for example, even in case of the same PC5 LINK QUALITY measurement value (or RSRP measurement value), the corresponding offset value may be determined by considering (or reflecting) pre-defined (or pre-signaled) factors (or parameters) having the possibility of deducing performance that is (actually) different.

Herein, for example, the corresponding factors (or parameters) may be defined as a transmission power of an eNB (causing influence to a link performance between the eNB and the RL_UE#Y) and/or TRAFFIC LOAD and/or TX (and/or RX) ANTENNA CONFIGURATION of the eNB (and/or the LINK QUALITY (e.g., RSRP, RSRQ) between the eNB and the RL_UE#Y that is measured by the RL_UE#Y) and/or TX (and/or RX) CAPABILITY of the RL_UE#Y (or RM_UE#X) (causing influence to a link performance between the RL_UE#Y and the RM_UE#X) and/or TX (and/or RX) ANTENNA CONFIGURATION of the RL_UE#Y (or RM_UE#X), and so on.

Herein, for example, a rule may be defined to that the information on the corresponding factors (or parameters) can be delivered to the RM_UE#X (or RL_UE#Y) from the eNB through a pre-defined signal (e.g., SIB (FOR RRC_IDLE UE, OUT-OF-COVERAGE UE), (DEDICATED) RRC SIGNALING (FOR RRC_CONNECTED UE)) or delivered from the RL_UE#Y to the RM_UE#X (and/or from the RM_UE#X to the RL_UE#Y) through a pre-defined D2D channel/signal (e.g., PSDCH (and/or PSCCH and/or PSSCH and/or PSBCH and/or PSSS/SSSS)).

Additionally, for example, the corresponding offset value may be differently configured in accordance with which service (e.g., VIDEO, VOICE) the RM_UE#X wishes to be relayed from the eNB (and/or RL_UE#Y).

As an exemplary case of applying the above-described proposed method, in case the RSRQ of the PC5 LINK QUALITY is defined based on a "RSRP that is deduced based on a DM-RS within the PSDCH" and a "RSSI (that is deduced in accordance with a pre-defined rule) of the PSSCH)" (i.e., in case a (PC5 LINK or RL_UE-TO-RM_UE LINK or RELAY LINK) RLF is declared, when the corresponding RSRQ value is decreased to a pre-defined (or pre-signaled) threshold value or less (during a pre-defined (or pre-signaled) TIME DURATION and/or as much as a pre-defined (or pre-signaled) number of times)), a rule allowing the RM_UE#X to deduce (or calculate) the RSRQ value of a final PC5 LINK QUALITY by applying a pre-defined (or pre-signaled) offset value (or a NOMINAL POWER CONTROL (PARAMETER) offset value) to a "RSRP that is deduced based on a DM-RS within the PSDCH" may be defined.

More specifically, in case the relay UE is selected based only on the DMRS related to the discovery, as described above, the selected relay UE may not be capable of ensuring the link quality corresponding to the actual communication. Accordingly, as described above, in order to ensure the link quality corresponding to the actual communication, a rule for deducing (or calculating) a RSRQ value (at this point, the RSRQ may have a correlation with the RSSI and the RSRP) of the final PC5 LINK QUALITY may also be defined based on the RSSI (at this point, the RSSI may reflect the interference of the communication) of a PSSCH that is related to the link quality of the actual communication.

Additionally, for example, a rule for deducing (or calculating) a RSRQ value of the final PC5 LINK QUALITY may also be defined based on the PSDCH RSSI and the RSRP of the PSSCH.

Herein, for example, in case of applying such rules, regardless of configuring different POWER CONTROL PARAMETER(S) for each of the PSDCH and the PSSCH (i.e., configuring different POWER CONTROL PARAMETER(S) for each of the PSDCH and the, in case each of the PSDCH and the PSSCH requires a different COVERAGE), the RM_UE#X may be capable of performing a correct PC5 LINK QUALITY measurement.

[Proposed Method #2] In case the [Proposed Method #1] is applied, a rule allowing the RL_UE#Y to notify information on a (pre-defined (or pre-signaled)) offset value that is to be applied to the PC5 LINK QUALITY measurement (performed by the RM_UE#X) to the RM_UE#X through a pre-defined D2D channel/signal may be defined.

Herein, for example, the D2D channel/signal of the corresponding purpose may be defined as a PSDCH (and/or PSCCH and/or PSSCH and/or PSBCH and/or PSSS/SSSS). In case of applying such rules, the RM_UE#X establishes CRC PASS and deduces offset value information (that is to be applied to the PC5 LINK QUALITY measurement between the RM_UE#X and the RL_UE#Y) that is EMBEDDED in the PSDCH, wherein the ID of the RL_UE#Y is detected. Thereafter, the deduced offset value information is applied to the corresponding PC5 LINK QUALITY measurement between the RM_UE#X and the RL_UE#Y.

Thereafter, the UE (e.g., remote UE) may perform D2D operation based on the link quality result (S1330).

The above-described method may also be applied along with or in parallel with the cases described below.

As another detailed example, although the above-described offset value may be applied to the PC5 LINK QUALITY, the above-described offset value may also be applied to a LINK (i.e., hereinafter referred to as "UU LINK") QUALITY between the eNB and the RL_UE#Y.

Herein, for example, when the RL_UE#Y notifies, to the RM_UE#X, UU LINK QUALITY information (and/or transmission power information of an eNB (causing influence on the link performance between the eNB and the RL_UE#Y and/or TRAFFIC LOAD information and/or TX (and/or RX) ANTENNA CONFIGURATION information of the eNB (and/or LINK QUALITY (e.g., RSRP, RSRQ) information between the eNB and the RL_UE#Y, which is measured by the RL_UE#Y) and/or TX (and/or RX) CAPABILITY information of the RL_UE#Y (or RM_UE#X) (causing influence on the link performance between the RL_UE#Y and the RM_UE#X) and/or TX (and/or RX) ANTENNA CONFIGURATION information of the RL_UE#Y (or RM_UE#X)) through a pre-defined (or pre-signaled) D2D channel/signal, the RM_UE#X may apply a predetermined offset to a UU LINK QUALITY in accordance with the state of the UU LINK QUALITY.

For example, in case the number of receiving antennas of the RL_UE#Y is equal to 4 (or 8), since a larger gain shall be acquired when receiving a signal through the UU LINK, as compared to the RL_UE, which has only 2 receiving antennas, the RL_UE may be selected by applying a pre-defined (or pre-signaled) offset value to the UU LINK QUALITY.

Additionally, for example, since the number of transmitting antennas of the RL_UE may act as a factor that increases the PC5 LINK QUALITY, in case the number of transmitting antennas of the RL_UE is equal to 2 (or 4) or more, a predetermined offset may be configured to the RSRP (and/or RSRQ) MEASUREMENT of the PC5 LINK in accordance with the number of transmitting antennas of the RL_UE.

In other words, in the [Proposed Method #1], [Proposed Method #2], the offset may be configured (or applied) to a MEASUREMENT value of a UU LINK, and different offset values in accordance with each status factor of the RL_UE (or corresponding to some specific factors among the status factors).

As another example, the offset may also be applied to an operation corresponding to an operation condition as a RELAY of the RL_UE. For example, when the eNB has configured a DISCOVERY SIGNAL transmission condition of the RELAY UE of the corresponding cell as a pre-defined (or pre-signaled) specific RSRP THRESHOLD of the UU LINK, UEs that are equal to or greater than the RSRP THRESHOLD may be operated to transmit a RELAY DISCOVERY MESSAGE.

At this point, a rule may be defined so that a RL_UE having 4 (or 8) RX ANTENNAs can apply a predetermined offset value in a UU LINK RSRP THRESHOLD and operate in a lower RSRP as well (i.e., this may be interpreted as the THRESHOLD that TRIGGERS the RELAY DISCOVERY TX being adjusted in accordance with the number of RX ANTENNAs of the RL_UE).

Alternatively, a rule may be defined so that a RL_UE having 2 (or 4) TX ANTENNAs can apply a predetermined offset value in a UU LINK RSRP THRESHOLD and operate in a lower RSRP as well (i.e., this may be interpreted as the THRESHOLD that TRIGGERS the RELAY DISCOVERY TX being adjusted in accordance with the number of TX ANTENNAs of the RL_UE).

Alternatively, in case a specific RELAY UE performs VIDEO RELAYING, a predetermined offset value may be configured in the RSRP THRESHOLD, which corresponds to a DISCOVERY SIGNAL transmission condition, so that a rule for transmitting a DISCOVERY MESSAGE by configuring a stricter (or higher) RSRP THRESHOLD as compared to when transmitting a VOICE.

As yet another example, a rule allowing the RM_UE#X to perform the RL_UE RE-SELECTION process only when the PC5 LINK QUALITY measurement value (between the RM_UE#X and the RL_UE#Y) (based on some (or all) of the proposed methods presented above (e.g., [Proposed Method #1], [Proposed Method #2])) decreases to a pre-defined (or pre-signaled) threshold value or less during a pre-defined (or pre-signaled) TIME DURATION as much as a pre-defined (or pre-signaled) number of times (or a rule allowing the RL_UE#Y to perform the RM_UE RE-SELECTION process only when the PC5 LINK QUALITY measurement value (between the RL_UE#Y and the RM_UE#X) (based on some (or all) of the proposed methods presented above (e.g., [Proposed Method #1], [Proposed Method #2])) decreases to a pre-defined (or pre-signaled) threshold value or less during a pre-defined (or pre-signaled) TIME DURATION as much as a pre-defined (or pre-signaled) number of times) may also be defined.

Herein, for example, by applying the above-described rules, a RL_UE RE-SELECTION (or RM_UE RE-SELECTION) that has adequately considered the time-varying PC5 LINK QUALITY may be performed.

Herein, for example, the "decrease of the PC5 LINK QUALITY measurement value (between the RM_UE#X and the RL_UE#Y) to a pre-defined (or pre-signaled) threshold value or less" (or the "decrease of the PC5 LINK QUALITY measurement value (between the RM_UE#X and the RL_UE#Y) to a pre-defined (or pre-signaled) threshold value or less as much as a pre-defined (or pre-signaled) number of times") may also be interpreted as a number of times CRC PASS is established by the PSDCH, which is transmitted from the corresponding RL_UE#Y (or RM_UE#X), being decreased to a pre-defined (or pre-signaled) threshold value or less.

An example of the remote UE newly selecting a relay UE, as described above, will hereinafter be described in detail.

Figure 14:
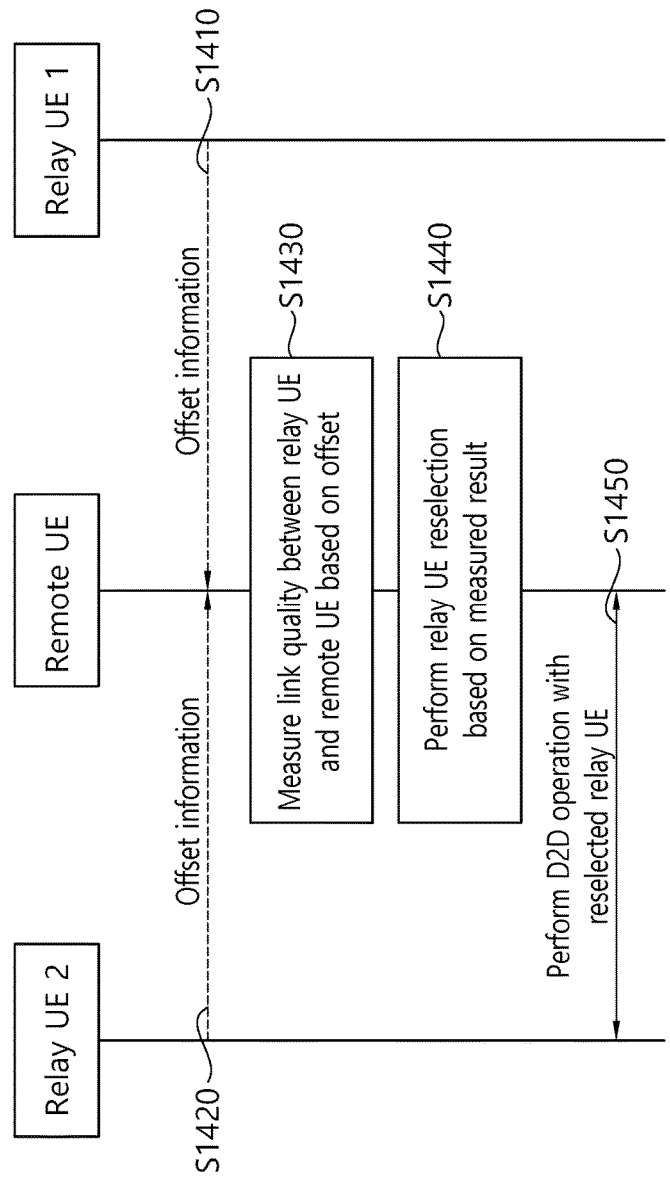
FIG. 14 is a flow chart showing a relay UE selection method of a remote UE according to another exemplary embodiment of the present invention.

FIG. 14 is a flow chart showing a relay UE selection method of a remote UE according to another exemplary embodiment of the present invention.

Referring to FIG. 14, the remote UE may receive offset information from a first relay UE (S1410). Additionally, the remote UE may also receive offset information from a second relay UE (S1420). At this point, a detailed example of the offset information that is received by the remote UE is as described above. And, also, as described above, the step of receiving, by the remote UE, offset information from a first relay UE and/or a second relay UE may not correspond to an essential configuration.

Based on the offset, the remote UE may measure a link quality between the first relay UE and the remote UE (S1430). At this point, a detailed example of measuring the link quality by the remote UE is as described above.

Subsequently, the remote UE may perform a relay UE re-selection based in the measured result (S1440). At this point the relay UE re-selection performed by the remote UE based on the measured result may include determining whether or not the remote UE should perform the relay UE re-selection and selecting a new relay UE (e.g., the second relay UE) by the remote UE based on the determined result.

Herein, a detailed example of determining whether or not the remote UE should perform the relay UE re-selection is as described above.

Based on the determined result, as an example of selecting a new relay UE by the remote UE, when the remote UE selects the second relay UE, the remote UE may use information (and/or offset) corresponding to the link quality between the remote UE and the second relay UE. Additionally, when the remote UE selects the second relay UE, the remote UE may also use information (and/or offset) corresponding to the link quality between the second relay UE and the base station. Also, when the remote UE selects the second relay UE, the remote UE may use both the information (and/or offset) corresponding to the link quality between the remote UE and the second relay UE and the information (and/or offset) corresponding to the link quality between the second relay UE and the base station. Thereafter, in case the remote UE selects the second relay UE as the new relay UE, the remote UE may perform D2D operation with the second relay UE (S1450).

Since the examples of the above-described proposed method may also be included as one of the methods for implementing the present invention, it will be apparent that the above-described method may also be considered as one of the proposed methods of the present invention.

Additionally, although the above-described proposed methods may be independently implemented, the present invention may also be implemented by combining (or integrating) part(s) of the proposed methods.

A rule may be defined so that the above-described proposed methods can be limitedly applied only to an FDD system (and/or TDD system) environment.

A rule may also be defined so that the above-described proposed methods can be limited applied only to a MODE 2 COMMUNICATION and/or a TYPE 1 DISCOVERY (and/or a MODE 1 COMMUNICATION and/or a TYPE 2 DISCOVERY).

Additionally, a rule may also be defined so that the above-described proposed methods can be limited applied only to an IN-COVERAGE D2D UE (and/or an OUT-COVERAGE D2D UE) (and/or a RRC_CONNECTED D2D UE (and/or a RRC_IDLE D2D UE) and/or a RELAY D2D UE (and/or a REMOTE UE (participating in a RELAY communication))).

A rule may also be defined so that the above-described proposed methods can be limited applied only to a D2D UE performing only D2D DISCOVERY (transmitting(/receiving)) operations (and/or a D2D UE performing only D2D COMMUNICATION (transmitting(/receiving)) operations).

A rule may also be defined so that the above-described proposed methods can be limited applied only to a scenario wherein only the D2D DISCOVERY is supported (configured) (and/or a scenario wherein only the D2D COMMUNICATION is supported (configured)).

A rule may also be defined so that the above-described proposed methods can be limited applied only to a case when D2D DISCOVERY SIGNAL receiving operations of another (UL) CARRIER within an INTER-FREQUENCY are performed (and/or a case when D2D DISCOVERY SIGNAL receiving operations of another INTER-PLMN based PLMN (UL) CARRIER are performed).

When D2D communication(/discovery) operations are performed between general D2D UE(S) (in addition to the case when D2D communication based relay communication (/discovery) operations are performed between the RM_UE and the RL_UE), the above-described proposed methods may also be used by the D2D (RX) UE for the purpose of performing (link) measurement for selecting its most suitable D2D (TX) UE by using a '(time/frequency) SYNCHRONIZATION REFERENCE'.

Figure 15:
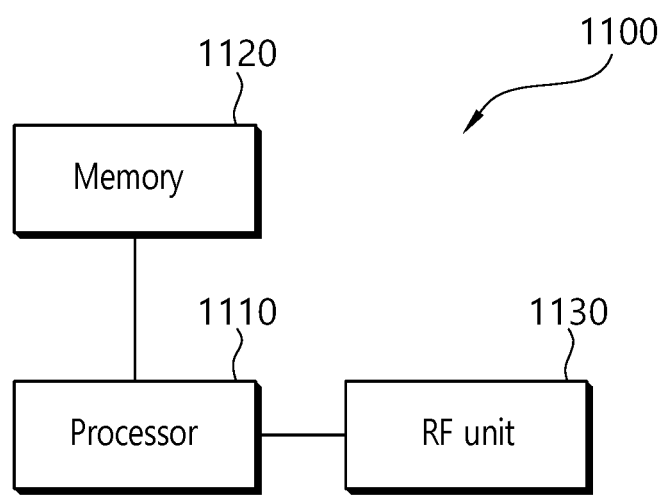
FIG. 15 is a block view showing a UE implementing the exemplary embodiment of the present invention.

FIG. 15 is a block view showing a UE implementing the exemplary embodiment of the present invention.

Referring to FIG. 15, the UE 1100 includes a processor 1110, a memory 1120, and a radio frequency (RF) unit 1130. The processor may receive information on an offset from a relay UE. Alternatively, the processor 1110 may measure a link quality between the relay UE and a remote UE and may perform D2D operation based on the measured result of the link quality.

The RF unit 1130 is operatively connected to the processor 110 and transmits and receives radio signals.

The processor may include an application-specific integrated circuit (ASIC), another chip set, a logical circuit, and/or a data processing device. The memory may include a read-only memory (ROM), a random access memory (RAM), a flash memory, a memory card, a storage medium, and/or another storage device. The RF unit may include a baseband circuit for processing radio signals. When the exemplary embodiment is implemented as software, the above-described method may be implemented as a module (process, function, and so on) performing the above-described functions. The module may be stored in the memory and may be executed by the processor. The memory may be located inside or outside of the processor and may be connected to the processor through a diversity of well-known means.

What is claimed is:

1. A method for selecting a relay user equipment (UE) in a wireless communication system, the method performed by a remote UE, which supports a device-to-device (D2D) operation, and comprising:

measuring a link quality between the relay UE and the remote UE based on an offset; and selecting the relay UE suitable for the remote UE based on the measurement, wherein the offset is determined based on first information informing elements related to a quality of communication between the remote UE and a base station through the relay UE, wherein the first information includes second information informing elements related to a link quality between the relay UE and the base station, and wherein the second information includes information on a traffic load.

2. The method of claim 1, wherein the second information further includes information on a transmission power of the base station.

3. The method of claim 1, wherein the second information further includes information on a transmission antenna configuration of the base station.

4. The method of claim 1, wherein a link between the relay UE and the base station is a Uu link.

5. The method of claim 1, wherein the first information includes third information informing elements related to a link performance between the relay UE and the remote UE.

6. The method of claim 5, wherein the third information includes information on a transmission capability of the relay UE.

7. The method of claim 5, wherein the third information includes information on an antenna configuration of the relay UE.

8. The method of claim 1, wherein the offset is configured in accordance with service types that the remote UE wishes to be provided from the base station.

9. The method of claim 1, wherein the first information is received from the relay UE through a pre-defined D2D channel.

10. The method of claim 1, wherein a link between the relay UE and the remote UE is a PC5 link.

11. A remote user equipment (UE) comprising:

a radio frequency (RF) unit configured to transmit and receive radio signals; and a processor being operatively connected to the RF unit, wherein the processor is configured to:

measure a link quality between a relay UE and the remote UE based on an offset, and select the relay UE suitable for the remote UE based on the measurement, wherein the offset is determined based on first information informing elements related to a quality of communication between the remote UE and a base station through the relay UE, wherein the first information includes second information informing elements related to a link quality between the relay UE and the base station, and wherein the second information includes information on a traffic load.

* * * * *